(12) United States Patent
Bagulho Monteiro Pereira

(10) Patent No.: US 10,521,583 B1
(45) Date of Patent: Dec. 31, 2019

(54) SYSTEMS AND METHODS FOR REMOTE DETECTION OF SOFTWARE THROUGH BROWSER WEBINJECTS

(71) Applicant: BitSight Technologies, Inc., Cambridge, MA (US)

(72) Inventor: Tiago Bagulho Monteiro Pereira, Lisbon (PT)

(73) Assignee: BitSight Technologies, Inc., Boston, MA (US)

( * ) Notice: Subject to any disclaimer, the term of this patent is extended or adjusted under 35 U.S.C. 154(b) by 0 days.

(21) Appl. No.: 16/170,680

(22) Filed: Oct. 25, 2018

(51) Int. Cl.
*G06F 12/14* (2006.01)
*H04L 9/32* (2006.01)
*G06F 21/54* (2013.01)
*G06F 21/53* (2013.01)
*G06F 17/22* (2006.01)
*G06F 21/56* (2013.01)

(52) U.S. Cl.
CPC .......... *G06F 21/54* (2013.01); *G06F 17/2247* (2013.01); *G06F 21/53* (2013.01); *G06F 21/566* (2013.01); *G06F 2221/2119* (2013.01)

(58) Field of Classification Search
CPC .... G06F 21/54; G06F 21/566; G06F 17/2247; G06F 21/53; G06F 2221/2119
USPC ...................... 726/22, 24; 713/168, 187, 188
See application file for complete search history.

(56) References Cited

U.S. PATENT DOCUMENTS

| 5,867,799 | A | 2/1999 | Lang et al. |
| 6,016,475 | A | 1/2000 | Miller et al. |
| 6,792,401 | B1 | 9/2004 | Nigro et al. |
| D525,264 | S | 7/2006 | Chotai et al. |
| D525,629 | S | 7/2006 | Chotai et al. |
| 7,100,195 | B1 | 8/2006 | Underwood |

(Continued)

FOREIGN PATENT DOCUMENTS

| WO | 2017/142694 A1 | 8/2017 |
| WO | 2019/023045 A1 | 1/2019 |

OTHER PUBLICATIONS

U.S. Appl. No. 29/598,299 U.S. Pat. No. D. 818,475, Computer Display With Security Ratings Graphical User Interface, filed Mar. 24, 2017.

(Continued)

*Primary Examiner* — Aravind K Moorthy
(74) *Attorney, Agent, or Firm* — Goodwin Procter LLP

(57) ABSTRACT

Computer-implemented methods and systems are provided for the detection of software presence remotely through the web browser by detecting the presence of webinjects in a web browser that visits a detection webpage. The methods can include delivering a detection webpage to a web browser, in which the detection webpage has detection code configured to detect a presence of the webinject in the detection webpage; and inspecting, by the detection code, rendering of content of the detection webpage in the browser to detect webinject content in the detection webpage by the webinject, the webinject content including one or more Hypertext Markup Language (HTML) components. The method can further include, if webinject content is detected, generating a fingerprint for each of the one or more HTML components; transmitting the one or more fingerprints to an external server; and classifying, by the external server, the webinject based on the one or more fingerprints.

20 Claims, 4 Drawing Sheets

(56) References Cited

U.S. PATENT DOCUMENTS

| | | |
|---|---|---|
| 7,194,769 B2 | 3/2007 | Lippmann et al. |
| 7,290,275 B2 | 10/2007 | Baudoin et al. |
| D604,740 S | 11/2009 | Matheny et al. |
| 7,650,570 B2 | 1/2010 | Torrens et al. |
| 7,747,778 B1 | 6/2010 | King et al. |
| 7,748,038 B2 | 6/2010 | Olivier et al. |
| 7,827,607 B2 | 11/2010 | Sobel et al. |
| D630,645 S | 1/2011 | Tokunaga et al. |
| 7,971,252 B2 | 6/2011 | Lippmann et al. |
| D652,048 S | 1/2012 | Joseph |
| D667,022 S | 9/2012 | LoBosco et al. |
| 8,370,933 B1 | 2/2013 | Buckler |
| 8,429,630 B2 | 4/2013 | Nickolov et al. |
| D682,287 S | 5/2013 | Cong et al. |
| D688,260 S | 8/2013 | Pearcy et al. |
| 8,504,556 B1 | 8/2013 | Rice et al. |
| D691,164 S | 10/2013 | Lim et al. |
| D694,252 S | 11/2013 | Helm |
| D694,253 S | 11/2013 | Helm |
| 8,621,621 B1 * | 12/2013 | Burns .............. H04L 63/1416 726/22 |
| D700,616 S | 3/2014 | Chao |
| 8,677,481 B1 * | 3/2014 | Lee .................. H04L 63/168 726/22 |
| 8,825,662 B1 | 9/2014 | Kingman et al. |
| D730,918 S | 6/2015 | Park et al. |
| 9,053,210 B2 | 6/2015 | Elnikety et al. |
| D740,847 S | 10/2015 | Yampolskiy et al. |
| D740,848 S | 10/2015 | Bolts et al. |
| D741,351 S | 10/2015 | Kito et al. |
| D746,832 S | 1/2016 | Pearcy et al. |
| 9,244,899 B1 | 1/2016 | Greenbaum |
| 9,294,498 B1 | 3/2016 | Yampolskiy et al. |
| D754,690 S | 4/2016 | Park et al. |
| D754,696 S | 4/2016 | Follett et al. |
| D756,371 S | 5/2016 | Bertnick et al. |
| D756,372 S | 5/2016 | Bertnick et al. |
| D756,392 S | 5/2016 | Yun et al. |
| D759,084 S | 6/2016 | Yampolskiy et al. |
| D759,689 S | 6/2016 | Olson et al. |
| 9,372,994 B1 | 6/2016 | Yampolskiy et al. |
| D760,782 S | 7/2016 | Kendler et al. |
| 9,384,206 B1 | 7/2016 | Bono et al. |
| 9,407,658 B1 * | 8/2016 | Kuskov .............. G06F 16/958 |
| 9,424,333 B1 | 8/2016 | Bisignani et al. |
| D771,695 S | 11/2016 | Yampolskiy et al. |
| D772,276 S | 11/2016 | Yampolskiy et al. |
| 9,501,647 B2 | 11/2016 | Yampolskiy et al. |
| D773,507 S | 12/2016 | Sagrillo et al. |
| D775,635 S | 1/2017 | Raji et al. |
| D776,136 S | 1/2017 | Chen et al. |
| D776,153 S | 1/2017 | Yampolskiy et al. |
| D777,177 S | 1/2017 | Chen et al. |
| 9,560,072 B1 | 1/2017 | Xu |
| D778,927 S | 2/2017 | Bertnick et al. |
| D778,928 S | 2/2017 | Bertnick et al. |
| D779,512 S | 2/2017 | Kimura et al. |
| D779,514 S | 2/2017 | Baris et al. |
| D779,531 S | 2/2017 | List et al. |
| D780,770 S | 3/2017 | Sum et al. |
| D785,009 S | 4/2017 | Lim et al. |
| D785,010 S | 4/2017 | Bachman et al. |
| D785,016 S | 4/2017 | Berwick et al. |
| 9,620,079 B2 | 4/2017 | Curtis |
| D787,530 S | 5/2017 | Huang |
| D788,128 S | 5/2017 | Wada |
| 9,641,547 B2 | 5/2017 | Yampolskiy et al. |
| 9,646,110 B2 | 5/2017 | Byrne et al. |
| D789,947 S | 6/2017 | Sun |
| D789,957 S | 6/2017 | Wu et al. |
| D791,153 S | 7/2017 | Rice et al. |
| D791,834 S | 7/2017 | Eze et al. |
| D792,427 S | 7/2017 | Weaver et al. |
| D795,891 S | 8/2017 | Kohan et al. |
| D796,523 S | 9/2017 | Bhandari et al. |
| D801,989 S | 11/2017 | Iketsuki et al. |
| D803,237 S | 11/2017 | Wu et al. |
| D804,528 S | 12/2017 | Martin et al. |
| D806,735 S | 1/2018 | Olsen et al. |
| D806,737 S | 1/2018 | Chung et al. |
| D809,523 S | 2/2018 | Lipka et al. |
| D812,633 S | 3/2018 | Saneii |
| D814,483 S | 4/2018 | Gavaskar et al. |
| D815,119 S | 4/2018 | Chalker et al. |
| D815,148 S | 4/2018 | Martin et al. |
| D816,105 S | 4/2018 | Rudick et al. |
| D816,116 S | 4/2018 | Selassie |
| 9,954,893 B1 * | 4/2018 | Zhao .................. G06F 16/958 |
| D817,970 S | 5/2018 | Chang et al. |
| D817,977 S | 5/2018 | Kato et al. |
| D819,687 S | 6/2018 | Yampolskiy et al. |
| 10,044,750 B2 * | 8/2018 | Livshits .............. H04L 63/145 |
| 10,079,854 B1 * | 9/2018 | Scott .................. H04L 63/1466 |
| 10,142,364 B2 | 11/2018 | Baukes et al. |
| 10,185,924 B1 | 1/2019 | McClintock et al. |
| 10,217,071 B2 | 2/2019 | Mo et al. |
| 10,230,753 B2 | 3/2019 | Yampolskiy et al. |
| 10,230,764 B2 | 3/2019 | Ng et al. |
| 10,235,524 B2 * | 3/2019 | Ford .................. G06F 21/568 |
| 10,257,219 B1 | 4/2019 | Geil et al. |
| 10,339,321 B2 | 7/2019 | Tedeschi |
| 10,339,484 B2 | 7/2019 | Pai et al. |
| 2001/0044798 A1 | 11/2001 | Nagral et al. |
| 2002/0083077 A1 | 6/2002 | Vardi |
| 2002/0133365 A1 | 9/2002 | Grey et al. |
| 2002/0164983 A1 | 11/2002 | Raviv et al. |
| 2003/0050862 A1 | 3/2003 | Bleicken et al. |
| 2003/0123424 A1 | 7/2003 | Jung |
| 2003/0187967 A1 | 10/2003 | Walsh et al. |
| 2004/0003284 A1 * | 1/2004 | Campbell .............. G06F 21/562 726/24 |
| 2004/0010709 A1 | 1/2004 | Baudoin et al. |
| 2004/0024859 A1 | 2/2004 | Bloch et al. |
| 2004/0098375 A1 | 5/2004 | DeCarlo |
| 2004/0133561 A1 | 7/2004 | Burke |
| 2004/0193907 A1 | 9/2004 | Patanella |
| 2004/0193918 A1 | 9/2004 | Green et al. |
| 2004/0199791 A1 | 10/2004 | Poletto et al. |
| 2004/0199792 A1 | 10/2004 | Tan et al. |
| 2004/0221296 A1 | 11/2004 | Ogielski et al. |
| 2004/0250122 A1 | 12/2004 | Newton |
| 2004/0250134 A1 | 12/2004 | Kohler et al. |
| 2005/0071450 A1 | 3/2005 | Allen et al. |
| 2005/0076245 A1 * | 4/2005 | Graham .............. G06F 21/552 726/4 |
| 2005/0080720 A1 | 4/2005 | Betz et al. |
| 2005/0108415 A1 | 5/2005 | Turk et al. |
| 2005/0131830 A1 | 6/2005 | Juarez et al. |
| 2005/0138413 A1 | 6/2005 | Lippmann et al. |
| 2005/0160002 A1 | 7/2005 | Roetter et al. |
| 2005/0278726 A1 | 12/2005 | Cano et al. |
| 2006/0036335 A1 | 2/2006 | Banter et al. |
| 2006/0107226 A1 | 5/2006 | Matthews et al. |
| 2006/0173992 A1 | 8/2006 | Weber et al. |
| 2006/0212925 A1 | 9/2006 | Shull et al. |
| 2006/0253581 A1 | 11/2006 | Dixon et al. |
| 2007/0067845 A1 | 3/2007 | Wiemer et al. |
| 2007/0143851 A1 | 6/2007 | Nicodemus et al. |
| 2007/0198275 A1 | 8/2007 | Malden et al. |
| 2007/0282730 A1 | 12/2007 | Carpenter et al. |
| 2008/0033775 A1 | 2/2008 | Dawson et al. |
| 2008/0047018 A1 | 2/2008 | Baudoin et al. |
| 2008/0091834 A1 | 4/2008 | Norton |
| 2008/0140495 A1 | 6/2008 | Bhamidipaty et al. |
| 2008/0162931 A1 | 7/2008 | Lord et al. |
| 2008/0172382 A1 | 7/2008 | Prettejohn |
| 2008/0208995 A1 | 8/2008 | Takahashi et al. |
| 2008/0209565 A2 | 8/2008 | Baudoin et al. |
| 2008/0222287 A1 | 9/2008 | Bahl et al. |
| 2008/0262895 A1 | 10/2008 | Hofmeister et al. |
| 2009/0044272 A1 | 2/2009 | Jarrett |
| 2009/0094265 A1 | 4/2009 | Vlachos et al. |
| 2009/0125427 A1 | 5/2009 | Atwood et al. |
| 2009/0132861 A1 | 5/2009 | Costa et al. |

(56) References Cited

U.S. PATENT DOCUMENTS

| | | |
|---|---|---|
| 2009/0161629 A1 | 6/2009 | Purkayastha et al. |
| 2009/0193054 A1 | 7/2009 | Karimisetty et al. |
| 2009/0216700 A1 | 8/2009 | Bouchard et al. |
| 2009/0265787 A9 | 10/2009 | Baudoin et al. |
| 2009/0293128 A1 | 11/2009 | Lippmann et al. |
| 2009/0299802 A1 | 12/2009 | Brennan |
| 2009/0300768 A1 | 12/2009 | Krishnamurthy et al. |
| 2009/0319420 A1 | 12/2009 | Sanchez et al. |
| 2009/0328063 A1* | 12/2009 | Corvera .............. G06F 9/54 719/315 |
| 2010/0017880 A1* | 1/2010 | Masood .............. G06F 21/51 726/24 |
| 2010/0042605 A1 | 2/2010 | Cheng et al. |
| 2010/0057582 A1 | 3/2010 | Arfin et al. |
| 2010/0186088 A1* | 7/2010 | Banerjee .............. G06F 21/51 726/23 |
| 2010/0205042 A1 | 8/2010 | Mun |
| 2010/0218256 A1 | 8/2010 | Thomas et al. |
| 2010/0262444 A1 | 10/2010 | Atwal et al. |
| 2010/0275263 A1 | 10/2010 | Bennett et al. |
| 2010/0281124 A1 | 11/2010 | Westman et al. |
| 2010/0281151 A1 | 11/2010 | Ramankutty et al. |
| 2011/0137704 A1 | 6/2011 | Mitra et al. |
| 2011/0145576 A1 | 6/2011 | Bettan |
| 2011/0185403 A1 | 7/2011 | Dolan et al. |
| 2011/0231395 A1 | 9/2011 | Vadlamani et al. |
| 2011/0239300 A1* | 9/2011 | Klein .............. G06F 21/565 726/23 |
| 2011/0296519 A1 | 12/2011 | Ide et al. |
| 2012/0036263 A1* | 2/2012 | Madden .............. G06F 21/6218 709/225 |
| 2012/0089745 A1 | 4/2012 | Turakhia |
| 2012/0158725 A1 | 6/2012 | Molloy et al. |
| 2012/0166458 A1 | 6/2012 | Laudanski et al. |
| 2012/0215892 A1 | 8/2012 | Wanser et al. |
| 2012/0255027 A1* | 10/2012 | Kanakapura .............. G06F 21/51 726/26 |
| 2012/0291129 A1* | 11/2012 | Shulman .............. H04L 63/1433 726/23 |
| 2013/0014253 A1 | 1/2013 | Neou et al. |
| 2013/0060351 A1 | 3/2013 | Imming et al. |
| 2013/0080505 A1 | 3/2013 | Nielsen et al. |
| 2013/0086521 A1 | 4/2013 | Grossele et al. |
| 2013/0091574 A1 | 4/2013 | Howes et al. |
| 2013/0124644 A1 | 5/2013 | Hunt et al. |
| 2013/0124653 A1 | 5/2013 | Vick et al. |
| 2013/0173791 A1 | 7/2013 | Longo |
| 2013/0291105 A1 | 10/2013 | Yan |
| 2013/0298244 A1 | 11/2013 | Kumar et al. |
| 2013/0305368 A1* | 11/2013 | Ford .............. G06F 21/568 726/23 |
| 2013/0333038 A1 | 12/2013 | Chien |
| 2013/0347116 A1 | 12/2013 | Flores et al. |
| 2014/0019196 A1 | 1/2014 | Wiggins et al. |
| 2014/0108474 A1 | 4/2014 | David et al. |
| 2014/0114843 A1* | 4/2014 | Klein .............. G06F 21/566 705/39 |
| 2014/0130158 A1* | 5/2014 | Wang .............. G06F 21/566 726/23 |
| 2014/0146370 A1* | 5/2014 | Banner .............. G06K 9/6232 358/406 |
| 2014/0189098 A1 | 7/2014 | MaGill et al. |
| 2014/0204803 A1 | 7/2014 | Nguyen et al. |
| 2014/0244317 A1 | 8/2014 | Roberts et al. |
| 2014/0283068 A1* | 9/2014 | Call .............. H04L 63/1425 726/23 |
| 2014/0288996 A1 | 9/2014 | Rence et al. |
| 2014/0304816 A1* | 10/2014 | Klein .............. G06F 21/56 726/23 |
| 2015/0033341 A1 | 1/2015 | Schmidtler et al. |
| 2015/0074579 A1 | 3/2015 | Gladstone et al. |
| 2015/0180883 A1* | 6/2015 | Aktas .............. H04L 63/145 726/23 |
| 2015/0261955 A1 | 9/2015 | Huang et al. |
| 2015/0288706 A1* | 10/2015 | Marshall .............. H04L 63/123 726/23 |
| 2015/0310188 A1 | 10/2015 | Ford et al. |
| 2015/0310213 A1 | 10/2015 | Ronen et al. |
| 2015/0347756 A1* | 12/2015 | Hidayat .............. G06F 21/57 726/22 |
| 2015/0350229 A1* | 12/2015 | Mitchell .............. G06F 16/955 726/23 |
| 2015/0381649 A1 | 12/2015 | Schultz et al. |
| 2016/0065613 A1* | 3/2016 | Cho .............. G06F 16/951 726/23 |
| 2016/0140466 A1 | 5/2016 | Sidebottom et al. |
| 2016/0147992 A1* | 5/2016 | Zhao .............. H04L 63/102 726/22 |
| 2016/0171415 A1 | 6/2016 | Yampolskiy et al. |
| 2016/0173522 A1 | 6/2016 | Yampolskiy et al. |
| 2016/0189301 A1 | 6/2016 | Ng et al. |
| 2016/0205126 A1 | 7/2016 | Boyer et al. |
| 2016/0248797 A1 | 8/2016 | Yampolskiy et al. |
| 2016/0253500 A1* | 9/2016 | Alme .............. H05K 999/99 726/23 |
| 2016/0259945 A1 | 9/2016 | Yampolskiy et al. |
| 2016/0337387 A1* | 11/2016 | Hu .............. G06F 16/245 |
| 2016/0344801 A1 | 11/2016 | Akkarawittayapoom |
| 2017/0048267 A1 | 2/2017 | Yampolskiy et al. |
| 2017/0063901 A1 | 3/2017 | Muddu et al. |
| 2017/0161409 A1 | 6/2017 | Martin |
| 2017/0236078 A1 | 8/2017 | Rasumov |
| 2017/0237764 A1 | 8/2017 | Rasumov |
| 2017/0279843 A1 | 9/2017 | Schultz et al. |
| 2017/0316324 A1 | 11/2017 | Barrett et al. |
| 2017/0324766 A1 | 11/2017 | Gonzalez Granadillo et al. |
| 2018/0013716 A1 | 1/2018 | Connell et al. |
| 2018/0103043 A1* | 4/2018 | Kupreev .............. H04L 63/1483 |
| 2018/0124110 A1 | 5/2018 | Hunt et al. |
| 2018/0139180 A1* | 5/2018 | Napchi .............. H04L 63/0227 |
| 2018/0157468 A1* | 6/2018 | Stachura .............. G06F 8/38 |
| 2018/0336348 A1* | 11/2018 | Ng .............. G06F 21/52 |
| 2018/0337938 A1* | 11/2018 | Kneib .............. H04L 12/40013 |
| 2018/0337941 A1 | 11/2018 | Kraning et al. |
| 2018/0365519 A1* | 12/2018 | Pollard .............. G06K 9/6228 |
| 2018/0375896 A1* | 12/2018 | Wang .............. G06F 21/566 |
| 2019/0034845 A1 | 1/2019 | Mo et al. |
| 2019/0140925 A1 | 5/2019 | Pon et al. |
| 2019/0147378 A1 | 5/2019 | Mo et al. |

OTHER PUBLICATIONS

U.S. Appl. No. 29/599,622, Computer Display With Security Ratings Graphical User Interface, filed Apr. 5, 2017.

U.S. Appl. No. 29/599,620, Computer Display With Security Ratings Graphical User Interface, filed Apr. 5, 2017.

U.S. Appl. No. 15/918,286, Correlated Risk in Cybersecurity, filed Mar. 12, 2018.

U.S. Appl. No. 14/021,585, now U.S. Pat. No. 9,438,615, the Office Action dated Mar. 11, 2016 and the Notice of Allowance dated Aug. 9, 2016.

U.S. Appl. No. 14/944,484, now U.S. Pat. No. 9,973,524, the Office Actions dated Mar. 11, 2016, Jul. 5, 2016, and Jan. 17, 2017 and the Notice of Allowance dated Oct. 20, 2017.

U.S. Appl. No. 15/142,667, now U.S. Pat. No. 9,830,569, the Office Actions dated Jul. 26, 2016, and Apr. 24, 2017 and the Notice of Allowance dated Oct. 11, 2017.

U.S. Appl. No. 29/599,622, the Notice of Allowance dated Dec. 11, 2018.

U.S. Appl. No. 29/599,620, the Notice of Allowance dated Nov. 27, 2018.

U.S. Appl. No. 16/015,686, the Office Action dated Nov. 16, 2018.

U.S. Appl. No. 15/918,286, the Office Action dated Aug. 7, 2018 and the Notice of Allowance dated Nov. 29, 2018; and.

U.S. Appl. No. 15/954,921, the Offices Action dated Sep. 4, 2018 and Jan. 3, 2019.

Artz, Michael Lyle, "NetSPA: A Network Security Planning Architecture," Massachusetts Institute of Technology, May 24, 2002, 97 pages.

(56) References Cited

OTHER PUBLICATIONS

Boyer, Stephen, et al., Playing with Blocks: SCAP-Enable Higher-Level Analyses, MIT Lincoln Laboratory, 5th Annual IT Security Automation Conference, Oct. 26-29, 2009, 35 pages.
Browne, Niall, et al., "Shared Assessments Program AUP and SAS70 Frequently Asked Questions," BITS, 4 pages.
Buckshaw, Donald L., "Use of Decision Support Techniques for Information System Risk Management," submitted for publication in Wiley's Encyclopedia of Quantitative Risk Assessment in Jan. 2007, 11 pages.
Buehler, Kevin S., et al., "Running with risk," The McKinsey Quarterly, No. 4, 2003, pp. 40-49.
Chu, Matthew, et al., "Visualizing Attack Graphs, Reachability, and Trust Relationships with NAVIGATOR" MIT Lincoln Library, VizSEC '10, Ontario, Canada, Sep. 14, 2010, 12 pages.
Crowther, Kenneth G., et al., "Principles for Better Information Security through More Accurate, Transparent Risk Scoring," Journal of Homeland Security and Emergency Management, vol. 7, Issue 1, Article 37, 2010, 20 pages.
Davis, Lois M., et al., "The National Computer Security Survey (NCSS) Final Methodology," Technical report prepared for the Bureau of Justice Statistics, Safety and Justice Program, RAND Infrastructure, Safety and Environment (ISE), 2008, 91 pages.
Dillon-Merrill, PhD., Robin L, et al., "Logic Trees: Fault, Success, Attack, Event, Probability, and Decision Trees," Wiley Handbook of Science and Technology for Homeland Security, 13 pages.
Edmonds, Robert, "ISC Passive DNS Architecture", Internet Systems Consortium, Inc., Mar. 2012, 18 pages.
Ingols, Kyle, et al., "Modeling Modern Network Attacks and Countermeasures Using Attack Graphs," MIT Lincoln Laboratory, 16 pages.
Ingols, Kyle, et al., "Practical Attack Graph Generation for Network Defense," MIT Lincoln Library, IEEE Computer Society, Proceedings of the 22nd Annual Computer Security Applications Conference (ACSAS'06), 2006, 10 pages.
Ingols, Kyle, et al., "Practical Experiences Using SCAP to Aggregate CND Data," MIT Lincoln Library, Presentation to NIST SCAP Conference, Sep. 24, 2008, 59 pages.
Johnson, Eric, et al., "Information Risk and the Evolution of the Security Rating Industry," Mar. 24, 2009, 27 pages.
Lippmann, RP., et al., "An Annotated Review of Papers on Attack Graphs," Project Report IA-1, Lincoln Laboratory, Massachusetts Institute of Technology, Mar. 31, 2005, 39 pages.
Lippmann, RP., et al., "Evaluating and Strengthening Enterprise Network Security Using Attack Graphs," Project Report IA-2, MIT Lincoln Laboratory, Oct. 5, 2005, 96 pages.
Lippmann, Rich, et al., NetSPA: a Network Security Planning Architecture, MIT Lincoln Laboratory, 11 pages.
Lippmann, Richard, et al., "Validating and Restoring Defense in Depth Using Attack Graphs," MIT Lincoln Laboratory, 10 pages.
Nye, John, "Avoiding Audit Overlap," Moody's Risk Services, Presentation, Source Boston, Mar. 14, 2008, 19 pages.
Paxson, Vern, "How the Pursuit of Truth Led Me to Selling Viagra," EECS Department, University of California, International Computer Science Institute, Lawrence Berkeley National Laboratory, Aug. 13, 2009, 68 pages.
Stone-Gross, Brett, et al., "FIRE: Finding Rogue Networks," 10 pages.
Taleb, Nassim N., et al., "The Six Mistakes Executives Make in Risk Management," Harvard Business Review, Oct. 2009, 5 pages.
Williams, Leevar, et al., "An Interactive Attack Graph Cascade and Reachability Display," MIT Lincoln Laboratory, 17 pages.
Williams, Leevar, et al., "GARNET: A Graphical Attack Graph and Reachability Network Evaluation Tool," MIT Lincoln Library, VizSEC 2009, pp. 44-59.
"Agreed Upon Procedures," Version 4.0, BITS, The Financial Institution Shared Assessments Program, Assessment Guide, Sep. 2008, 56 pages.
"An Executive View of IT Governance," IT Governance Institute, 2009, 32 pages.
"Assessing Risk in Turbulent Times," A Workshop for Information Security Executives, Glassmeyter/McNamee Center for Digital Strategies, Tuck School of Business at Dartmouth, Institute for Information Infrastructure Protection, 2009, 17 pages.
"Assuring a Trusted and Resilient Information and Communications Infrastructure," Cyberspace Policy Review, May 2009, 76 pages.
"Master Security Criteria," Version 3.0, BITS Financial Services Security Laboratory, Oct. 2001, 47 pages.
"Plugging the Right Holes," Lab Notes, MIT Lincoln Library, Posted Jul. 2008, retrieved Sep. 14, 2010 from http://www.11.miLedufpublicationsflabnotesfpluggingtherightho!, 2 pages.
"Report on Controls Placed in Operation and Test of Operating Effectiveness," EasCorp, Jan. 1 through Dec. 31, 2008, prepared by Crowe Horwath, 58 pages.
"Shared Assessments: Getting Started," BITS, 2008, 4 pages.
2009 Data Breach Investigations Report, study conducted by Verizon Business RISK Team, 52 pages.
"Twenty Critical Controls for Effective Cyber Defense: Consensus Audit," Version 2.3, Nov. 13, 2009, retrieved on Apr. 9, 2010 from http://www.sans.org/critical-security-controls/print.php, 52 pages.
Dun & Bradstreet Corp. Stock Report, Standard & Poor's, Jun. 6, 2009, 8 pages.
Dun & Bradstreet, The DUNSRight Quality Process: Power Behind Quality Information, 24 pages.
Equifax Inc. Stock Report, Standard & Poor's, Jun. 6, 2009, 8 pages.
Method Documentation, CNSS Risk Assessment Tool Version 1.1, Mar. 31, 2009, 24 pages.
Proposal and Award Policies and Procedures Guide, Part I—Proposal Preparation & Submission Guidelines GPG, The National Science Foundation, Feb. 2009, 68 pages.
Rare Events, Oct. 2009, JASON, The Mitre Corporation, Oct. 2009, 104 pages.
Report to the Congress on Credit Scoring and Its Effects on the Availability and Affordability of Credit, Board of Governors of the Federal Reserve System, Aug. 2007, 304 pages.
SBIR Phase 1: Enterprise Cyber Security Scoring, CyberAnalytix, LLC, http://www.nsf.gov/awardsearch/showAward.do?AwardNumber=I013603, Apr. 28, 2010, 2 pages.
The CIS Security Metrics v1.0.0, The Center for Internet Security, May 11, 2009, 90 pages.
The Fair Credit Reporting Act (FCRA) of the Federal Trade Commission (FTC), Jul. 30, 2004, 86 pages.
The Financial Institution Shared Assessments Program, Industry Positioning and Mapping Document, BITS, Oct. 2007, 44 pages.
Computer Network Graph-Bees, http://bioteams.com/2007/04/30/visualizing_complex_networks.html, date accessed Sep. 28, 2016, 2 pages.
Computer Network Graph-Univ. of Michigan, http://people.cst.cmich.edu/liao1q/research.shtml, date accessed Sep. 28, 2016, 5 pages.
Hacking Exposed 6, S. McClure et al., copyright 2009, 37 pages.
MaxMind, https://www.maxmind.com/en/about-maxmind, https://www.maxmind.com/en/geoip2-isp-database, date accessed Sep. 28, 20116, 3 pages.
Netcraft, www.netcraft.com, date accessed Sep. 28, 2016, 2 pages.
NetScanTools Pro, http://www.netscantools.com/nstpromain.html, date accessed Sep. 28, 2016, 2 pages.
Network Security Assessment, C. McNab, copyright 2004, 13 pages.
RFC 781, https://tools.ietf.org/html/rfc781, date accessed Sep. 28, 2016, 3 pages.
RFC 950, https://tools.ietf.org/html/rfc950, date accessed Sep. 28, 2016, 19 pages.
RFC 954, https://tools.ietf.org/html/rfc954, date accessed Sep. 28, 2016, 5 pages.
RFC 1834, https://tools.ietf.org/html/rfc1834, date accessed Sep. 28, 2016, 7 pages.
SamSpade Network Inquiry Utility, https://www.sans.org/reading-room/whitepapers/tools/sam-spade-934, date accessed Sep. 28, 2016, 19 pages.
Snort Intrusion Monitoring System, http://archive.oreilly.com/pub/h/1393, date accessed Sep. 28, 2016, 3 pages.

(56) References Cited

OTHER PUBLICATIONS

Wikipedia, https://en.wikipedia.org/wiki/Crowdsourcing, date accessed Sep. 28, 2016, 25 pages.
Security Warrior, Cyrus Peikari, Anton, Chapter 8: Reconnaissance, 6 pages.
"Gephi (gephi.org)," accessed on the internet at https://web.archive.org/web/20151216223216/https://gephi.org/; Dec. 16, 2015; 1 page.
"mile 2 CPTE Maltego Demo," accessed on the internet at http://www.youtube.com/watch?v=o2oNKOUzP0U; Jul. 12, 2012; 1 page.
"Neo4j (neo4j.com)," accessed on the internet at https://web.archive.org/web/20151220150341/http://neo4j.com:80/developer/guide-data-visualization/; Dec. 20, 2015; 1 page.
"Creating Transparency with Palantir," accessed on the internet at https://www.youtube.com/watch?v=8cbGChfagUA; Jul. 5, 2012; 1 page.
"Palantir Cyber: Uncovering malicious behavior at petabyte scale," accessed on the internet at https://www.youtube.com/watch?v=_EhYezVO6EE; Dec. 21, 2012; 1 page.
Borgatti, et al., "On Social Network Analysis in a Supply Chain Context," Journal of Supply Chain Management; 45(2): 5-22; Apr. 2009. 18 pages.
Carstens, et al., "Modeling Company Risk and Importance in Supply Graphs," European Semantic Web Conference 2017: The Semantic Web pp. 18-31.
Gundert, Levi, "Big Data in Security—Part III: Graph Analytics," accessed on the Internet at https://blogs.cisco.com/security/big-data-in-security-part-iii-graph-analytics; Cisco Blog, Dec. 2013, 8 pages.
Jean, "Cyber Security: How to use graphs to do an attack analysis," accessed on the internet at https://linkurio.us/blog/cyber-security-use-graphs-attack-analysis/; Aug. 2014, 11 pages.
"Palantir.com," accessed on the Internet at http://www.palantir.com/; Dec. 2015; 1 page.
KC Claffy, "Internet measurement and data analysis: topology, workload, performance and routing statistics," accessed on the Internet at http://www.caida.org/publications/papers/1999/Nae/Nae.html., NAE '99 workshop, 1999, 22 pages.
Maltego XL, accessed on the Internet at https://www.paterva.com/web7/buy/maltego-clients/maltego-xl.php, 5 pages.
Massimo Candela, "Real-time BGP Visualisation with BGPlay," accessed on the Internet at https://labs.ripe.net/Members/massimo_candela/real-time-bgp-visualisation- with-bgplay), Sep. 30, 2015, 8 pages.
Noel, et al., "Big-Data Architecture for Cyber Attack Graphs, Representing Security Relationships in NoSQL Graph Databases," The MITRE Corporation, 2014, 6 pages.
Wagner, et al., "Assessing the vulnerability of supply chains using graph theory" Int. J. Production Economics 126 (2010) 121-129.
Moradi, et al., "Quantitative Models for Supply Chain Management," IGI Global, 2012, 29 pages.
Joslyn, et al., "Massive Scale Cyber Traffic Analysis: A Driver for Graph Database Research," Proceedings of the First International Workshop on Graph Data Management Experience and Systems (GRADES 2013), 6 pages.
"About Neo4j," 1 page.
"Amazon Mechanical Turk," accessed on the internet at https://www.mturk.com/; 7 pages.
"Rapid? Nexpose Vulnerability Scanner," accessed on the internet at https://www.rapid7.com/products/nexpose/download/, 5 pages.
"Tenable Nessus Network Vulnerability Scanner," accessed on the internet at https://www.tenable.com/products/nessus/nessus-professional; 13 pages.
"Computer Network Graph," http://www.opte.org; 1 page.
McNab, "Network Security Assessment," copyright 2004, 55 pages.
BitSight, "Cyber Security Myths Versus Reality: How Optimism Bias Contributes to Inaccurate Perceptions of Risk", Jun. 2015, Dimensional Research, pp. 1-9.
U.S. Appl. No. 13/240,572 and pending claims.
U.S. Appl. No. 61/386,156.
U.S. Appl No. 14/944,484 and pending claims.
U.S. Appl. No. 14/021,585.
Pending claims for U.S. Appl. No. 14/021,585.
Pending claims for U.S. Appl. No. 13/240,572.
Pending claims for U.S. Appl. No. 14/944,484.
U.S. Appl. No. 14/021,585 and pending claims.
Pending claims of U.S. Appl. No. 13/240,572.
Hachem, Sara; Toninelli, Alessandra; Pathak, Animesh; Issany, Valerie. Policy-Based Access Control in Mobile Social Ecosystems. 2011 IEEE International Symposium on Policies for Distributed Systems and Networks (POLICY). Http://ieeexplore.ieee.org/stamp/stamp.jsp?arnumber=5976796, 8 pages.
Srivastava, Divesh; Velegrakis, Yannis. Using Queries to Associate Metadata with Data. IEEE 23rd International Conference on Data Engineering. Pub. Date: 2007. http://ieeexplore.ieee.org/stamp/stamp.isp?arnumber=4221823, 3 pages.
Provos et al., "The Ghost in the Browser Analysis of Web-based Malware", 2007, 9 pages.
Li et al., "Finding the Linchpins of the Dark Web: a Study on Topologically Dedicated Hosts on Malicious Web Infrastructures", IEEE, 2013, 15 pages.
Bhilare et al., "Protecting Intellectual Property and Sensitive Information in Academic Campuses from Trusted Insiders: Leveraging Active Directory", SIGUCC, Oct. 2009, 5 pages.
Jin et al, "Identifying and tracking suspicious activities through IP gray space analysis", MineNet, Jun. 12, 2007, 6 pages.
Chuvakin, "SIEM: Moving beyond compliance", RSA White Paper, 2010, 16 pages.
U.S. Appl. No. 15/377,574 U.S. Pat. No. 9,705,932, Methods and Systems for Creating, De-Duplicating, and Accessing Data Using an Object Storage System, filed Dec. 13, 2016.
U.S. Appl. No. 14/021,585 U.S. Pat. No. 9,438,615 Published as: US2015/0074579, Security Risk Management, filed Sep. 9, 2013.
U.S. Appl. No. 15/216,955 Published as: US2016/0330231, Methods for Using Organizational Behavior for Risk Ratings, filed Jul. 22, 2016.
U.S. Appl. No. 15/239,063 Published as: US2017/0093901, Security Risk Management, filed Aug. 17, 2016.
U.S. Appl. No. 16/405,121, Methods for Using Organizational Behavior for Risk Ratings, filed May 7, 2019.
U.S. Appl. No. 13/240,572 Published as: US2016/0205126, Information Technology Security Assessment System, filed Sep. 22, 2011.
U.S. Appl. No. 14/944,484 U.S. Pat. No. 9,973,524 Published as: US2016/0323308, Information Technology Security Assessment System, filed Nov. 18, 2015.
U.S. Appl. No. 15/142,677 U.S. Pat. No. 9,830,569 Published as: US/2016/0239772, Security Assessment Using Service Provider Digital Asset Information, filed Apr. 29, 2016.
U.S. Appl. No. 15/134,845 U.S. Pat. No. 9,680,858, Annotation Platform for a Security Risk System, filed Apr. 21, 2016.
U.S. Appl. No. 15/044,952 Published as: US2017/0236077, Relationships Among Technology Assets and Services and the Entities Responsible for Them, filed Feb. 16, 2016.
U.S. Appl. No. 15/089,375 U.S. Pat. No. 10,176,445 Published as: US2017/0236079, Relationships Among Technology Assets and Services and the Entities Responsible for Them, filed Apr. 1, 2016.
U.S. Appl. No. 29/598,298 U.S. Pat. No. D. 835,631, Computer Display Screen With Graphical User Interface, filed Mar. 24, 2017.
U.S. Appl. No. 29/598,299 U.S. Pat. No. D. 818,475, Computer Display With Security Rating Graphical User Interface, filed Mar. 24, 2017.
U.S. Appl. No. 29/599,622 U.S. Pat. No. D. 847,169, Computer Display With Security Rating Graphical User Interface, filed Apr. 5, 2017.
U.S. Appl. No. 29/599,620 U.S. Pat. No. D. 846,562, Computer Display With Security Rating Graphical User Interface, filed Apr. 5, 2017.
U.S. Appl. No. 16/015,686, Methods for Mapping IP Addresses and Domains to Organizations Using User Activity Data, filed Jun. 22, 2018.
U.S. Appl. No. 16/543,075, Methods for Mapping IP Addresses and Domains to Organizations Using User Activity Data, filed Aug. 16, 2019.

(56) References Cited

OTHER PUBLICATIONS

U.S. Appl. No. 15/918,286 U.S. Pat. No. 10,257,219, Correlated Risk in Cybersecurity, filed Mar. 12, 2018.
U.S. Appl. No. 16/292,956, Correlated Risk in Cybersecurity, filed Mar. 5, 2019.
U.S. Appl. No. 15/954,921, Systems and Methods for External Detection of Misconfigured Systems, filed Apr. 17, 2018.
U.S. Appl. No. 29/666,942, Computer Display With Forecast Graphical User Interface, filed Oct. 17, 2018.
U.S. Appl. No. 16/360,641, Systems and Methods for Forecasting Cybersecurity Ratings Based on Event-Rate Scenarios, filed Mar. 21, 2019.
U.S. Appl. No. 16/514,771, Systems and Methods for Generating Security Improvement Plans for Entities, filed Jul. 17, 2019.
U.S. Appl. No. 29/677,306, Computer Display With Corporate Hierarchy Graphical User Interface, filed Jan. 18, 2019.
U.S. Appl. No. 15/377,574, now U.S. Pat. No. 9,705,932, the Office Action dated Mar. 2, 2017 and the Notice of Allowance dated Jun. 1, 2017.
U.S. Appl. No. 14/021,585, now U.S. Pat. No. 9,438,615, the Office Action dated Mar. 11, 2016 and the Notice of Allowance dated Aug. 6, 2016.
U.S. Appl. No. 15/216,955, the Office Actions dated Nov. 4, 2016, Mar. 9, 2017, Jun. 6, 2017, Dec. 5, 2017, and Aug. 29, 2018, and the Notice of Allowance dated Feb. 6, 2019.
U.S. Appl. No. 15/239,063, the Office Action dated Mar. 21, 2018 and the Notice of Allowance dated Jan. 14, 2019.
U.S. Appl. No. 16/405,121, the Office Action dated Aug. 1, 2019.
U.S. Appl. No. 13/240,572, the Office Actions dated May 7, 2013, Nov. 21, 2013, Jun. 16, 2014, Feb. 27, 2015, Jun. 3, 2015, Oct. 26, 2015, Mar. 10, 2016, Feb. 13, 2017, and the Examiner's Answer to Appeal Brief dated May 16, 2018.
U.S. Appl. No. 14/944,484, now U.S. Appl. No. 9,973,524, the Office Actions dated Mar. 11, 2016, Jul. 5, 2016, and Jan. 17, 2017 and the Notice of Allowance dated Oct. 20, 2017.
U.S. Appl. No. 15/142,677, now U.S. Pat. No. 9,830,569, the Office Actions dated Jul. 26, 2016, and Apr. 24, 2017 and the Notice of Allowance dated Oct. 11, 2017.
U.S. Appl. No. 15/134,845, now U.S. Pat. No. 9,680,858, the Office Actions dated Jul. 19, 2016 and Jan. 26, 2017, and the Notices of Allowance dated Apr. 27, 2017 and May 9, 2017.
U.S. Appl. No. 15/044,952, the Office Action dated Jul. 8, 2019.
U.S. Appl. No. 15/089,375, now U.S. Pat. No. 10,176,445, the Office Actions dated Sep. 9, 2016, May 17, 2017, and Nov. 17, 2017 and the Notice of Allowance dated Aug. 9, 2018.
U.S. Appl. No. 29/598,298, now U.S. Pat. No. D. 835,631, the Notice of Allowance dated Aug. 15, 2018.
U.S. Appl. No. 29/598,299, now U.S. Pat. No. D. 818,475, the Notice of Allowance dated Jan. 2, 2018.
U.S. Appl. No. 29/599,622, now U.S. Pat. No. D. 847,169, the Notice of Allowance dated Dec. 11, 2018.
U.S. Appl. No. 29/599,620, now U.S. Pat. No. D. 846,562, the Notice of Allowance dated Nov. 27, 2018.
U.S. Appl. No. 16/015,686, the Office Action dated Nov. 16, 2018 and the Notice of Allowance dated May 10, 2019.
U.S. Appl. No. 15/918,286, the Office Action dated Aug. 7, 2018 and the Notice of Allowance dated Nov. 29, 2018.
U.S. Appl. No. 16/292,956, the Office Action dated Jul. 10, 2019.
U.S. Appl. No. 15/954,921, the Office actions dated Sep. 4, 2018, Jan. 3, 2019, and Aug. 19, 2019; and.
U.S. Appl. No. 16/360,641, the Office Action dated Aug. 7, 2019.
Gilgur, et al., "Percentile-Based Approach to Forecasting Workload Growth" Proceedings of CMG'15 Performance and Capacity International Conference by the Computer Measurement Group. No. 2015 (Year:2015).

* cited by examiner

SYSTEMS AND METHODS FOR REMOTE DETECTION OF SOFTWARE THROUGH BROWSER WEBINJECTS

TECHNICAL FIELD

The following disclosure is directed to methods and systems for the detection of software remotely through a web browser and, more specifically, methods and systems for detection of software remotely through a web browser by detecting the presence of webinjects in a web browser.

BACKGROUND

Modern software often uses webinjects to change with a user's web browsing experience. Examples of such software include malware, adware, browser extensions, and anti-virus programs. Webinjects are pieces of foreign code, e.g., Hypertext Markup Language (HTML) or JavaScript elements, that can be locally injected into webpages visited by the user. These webinjects can be injected through several techniques, for example, through a browser extension application programming interface (API), browser process memory injection, or local network proxies. The webinjects can change the webpage to steal information (e.g., passwords, personal data, etc.), present additional content to the user (e.g., advertising), and/or improve the user's browsing experience (e.g., by blocking advertising, presenting useful information, improving functionality, etc.). Motives for inserting webinjects into webpages can range from stealing information to displaying advertising, or even improving the user's experience.

SUMMARY

Disclosed herein are systems and methods to detect webinjects, and their sources, in webpages. Some approaches for detecting software presence remotely include (i) scanning the Internet for systems that publicly expose services and (ii) using a sinkhole to isolate a domain and receive software connections as the software reaches the sinkhole, which, in some instances requires the subject domain to be expired or otherwise available. Another approach uses crawlers in a peer-to-peer (P2P) configuration, where the crawler joins the P2P network and receives connections from other peers. However, this approach is limited to P2P-enabled software. This method, if deployed through advertising networks or other partners that can provide large amounts of traffic, can detect a considerable number of software installations by detecting the presence of webinjects in the browser. The exemplary methods and systems described herein can be used alone or complement any one or more of the above methods to detect webinjects.

In a first aspect, a computer-implemented method is provided for the detection of webinjects. The method includes delivering a detection webpage to a web browser. The detection webpage has detection code configured to detect a presence of the webinject in the detection webpage. The method further includes inspecting, by the detection code, rendering of content of the detection webpage in the browser to detect webinject content inserted into the detection webpage by the webinject. The webinject content includes one or more Hypertext Markup Language (HTML) components. The method further includes, if webinject content is detected, generating, by the detection code, a fingerprint for each of the one or more HTML components; transmitting, by the detection code, the one or more fingerprints to an external server; and classifying, by the external server, the webinject based on the one or more fingerprints.

Embodiments of the method can include any one or more of the below features. The method can include transmitting to the external sever, by the detection code, one or more HTML components of the detected webinject content. The transmission can be on a portion of the executions of the detection code. The transmission can be on a small sample of the executions. For example, the transmission can be on 1% or less of the executions of the detection code. These HTML component(s) can be transmitted with their respective fingerprints. The method can include identifying the origin software of the HTML component(s) by (i) searching for the HTML component(s) in sandboxed executions of software and/or (ii) searching through privately- and/or publicly-available data sources. The sandboxed executions of software may be associated with, may be related to, or possibly be the origin software. The method can further include generating a database including (a) the fingerprint(s), (b) the name of the origin software, (c) one or more features of the detected webinject content, and/or (d) one or more capabilities (e.g., intercepting communication or changing form contents) of the detected webinject content. This database can be used to classify webinject(s) detected on remote systems.

Delivering the detection webpage having detection code can further include configuring the detection code such that at least one of a source domain, a path, or an HTML structure of the detection webpage is configured to trigger an injection of the webinject content by the webinject. The detection code can include JavaScript or Content Security Policy (CSP). The detection webpage can be inserted into an Hypertext Markup Language (HTML) inline frame. The method can further include generating a classification of the one or more webinjects. Classifying the webinject based on the one or more fingerprints can further include determining an originating software of the webinject based on the one or more fingerprints. Classifying the webinject based on the one or more fingerprints can further include mapping the one or more fingerprints to a feature set of the webinject. The detection webpage can be delivered by a traffic generating entity. Delivering a detection webpage to a web browser can further include embedding, by the traffic generating entity, the detection webpage into an external webpage. Delivering a detection webpage to a web browser can occur upon receiving an indication of a user interaction with the content of a webpage, wherein the webpage is separate from the detection webpage. The webinject content can include added or modified content by the webinject.

In a second aspect, a system is provided for detection of webinjects. The system includes one or more computer systems programmed to perform operations that include delivering a detection webpage to a web browser. The detection webpage has detection code configured to detect a presence of the webinject in the detection webpage. The operations further include inspecting, by the detection code, rendering of content of the detection webpage in the browser to detect webinject content inserted into the detection webpage by the webinject. The webinject content includes one or more Hypertext Markup Language (HTML) components. The operations further include, if webinject content is detected, generating, by the detection code, a fingerprint for each of the one or more HTML components; transmitting, by the detection code, the one or more fingerprints to an external server; and classifying, by the external server, the webinject based on the one or more fingerprints.

Embodiments of the system can include any one or more of the below features. The operations can include transmitting to the external sever, by the detection code, one or more HTML components of the detected webinject content. The transmission can be on a portion of the executions of the detection code. The transmission can be on a small sample of the executions. For example, the transmission can be on 1% or less of the executions of the detection code. These HTML component(s) can be transmitted with their respective fingerprints. The operations can include identifying the origin software of the HTML component(s) by (i) searching for the HTML component(s) in sandboxed executions of software and/or (ii) searching through privately- and/or publicly-available data sources. The sandboxed executions of software may be associated with, may be related to, or possibly be the origin software. The operations can further include generating a database of (a) the fingerprint(s), (b) the name of the origin software, (c) one or more features of the detected webinject content, and/or (d) one or more capabilities (e.g. intercepting communication or changing form contents) of the detected webinject content. This database can be used to classify webinject(s) detected on remote systems.

Delivering the detection webpage having detection code can further include configuring the detection code such that at least one of a source domain, a path, or an HTML structure of the detection webpage is configured to trigger an injection of the webinject content by the webinject. The detection code can include JavaScript or Content Security Policy (CSP). The detection webpage is inserted into an Hypertext Markup Language (HTML) inline frame. The system can further include generating a classification of the one or more webinjects. Classifying the webinject based on the one or more fingerprints can further include determining an originating software of the webinject based on the one or more fingerprints. Classifying the webinject based on the one or more fingerprints can further include mapping the one or more fingerprints to a feature set of the webinject. The detection webpage can be delivered by a traffic generating entity. Delivering a detection webpage to a web browser can further include embedding, by the traffic generating entity, the detection webpage into an external webpage. Delivering a detection webpage to a web browser can occur upon receiving an indication of a user interaction with the content of a webpage, wherein the webpage is separate from the detection webpage. The webinject content can include added or modified content by the webinject.

DETAILED DESCRIPTION

Figure 2A:
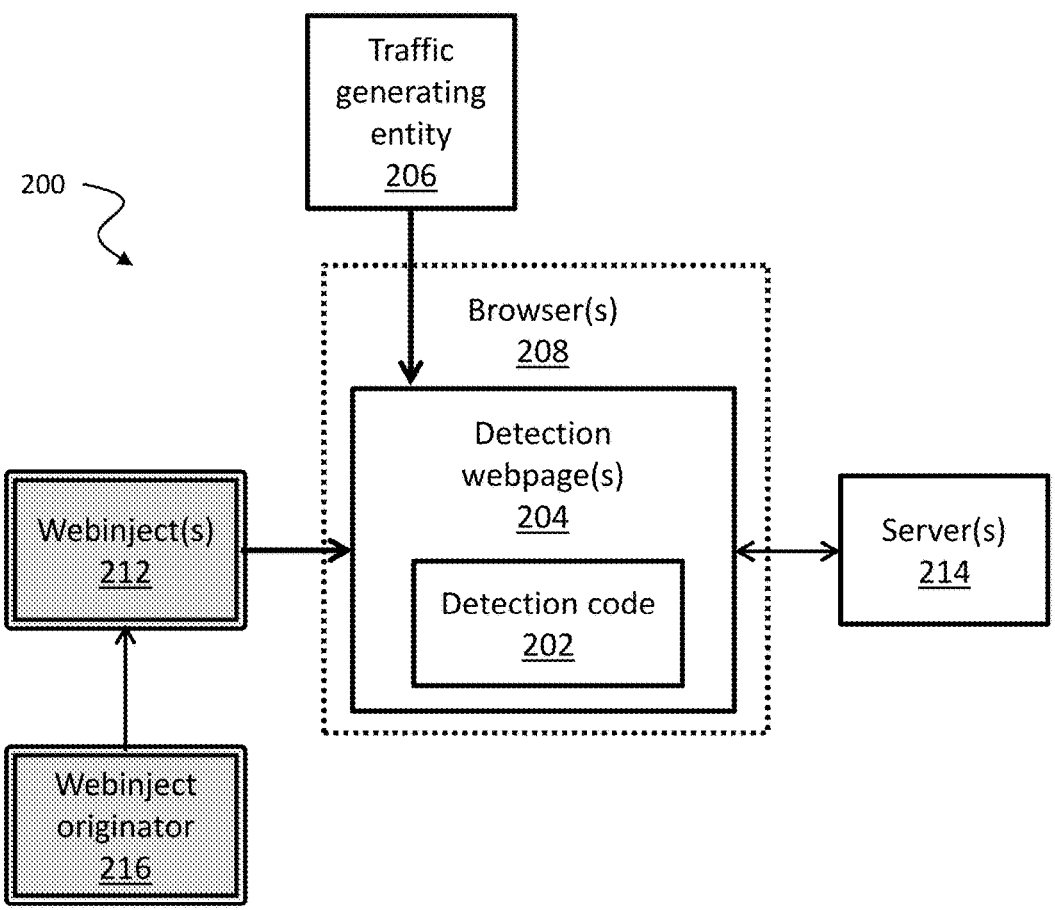
FIGS. 2A-2B are diagrams of exemplary embodiments of systems for the remote detection of webinjects.
Figure 2B:
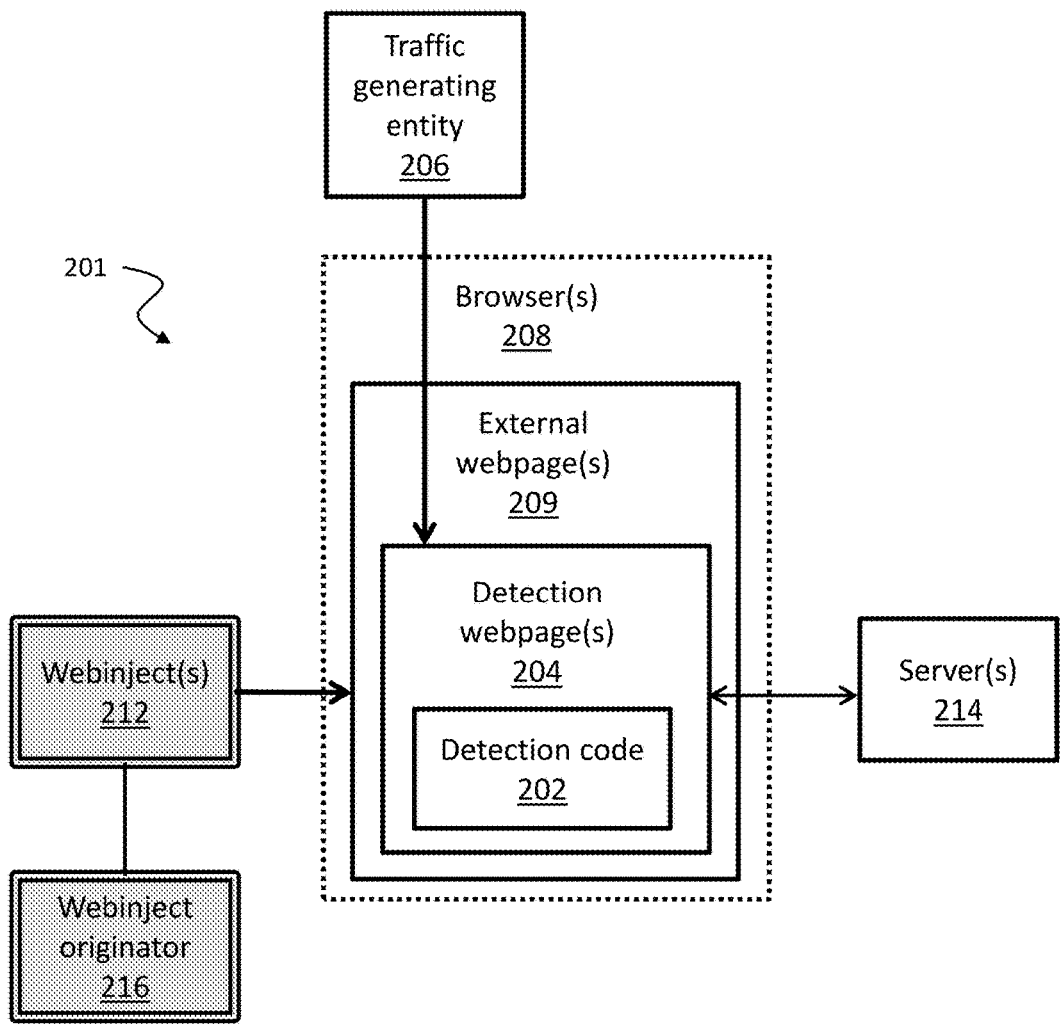
Figure 3:
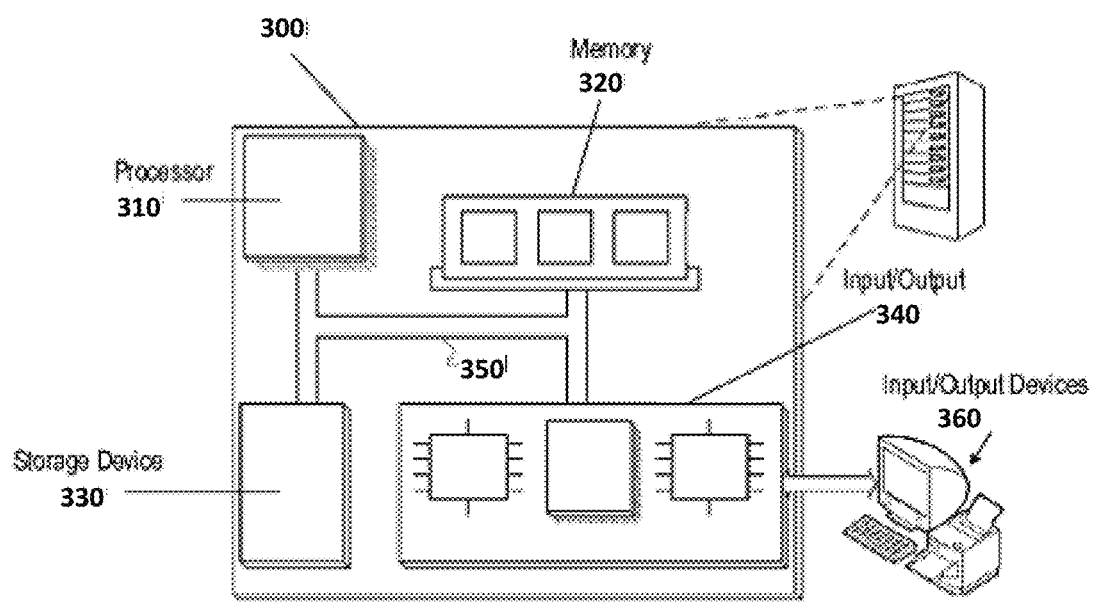
FIG. 3 is a block diagram of an example computer system that can be used in implementing the systems and methods described herein.

Disclosed herein are exemplary embodiments of systems and methods for the remote detection of software, specifically by the detection of webinjects in a web browser. The detection and classification of webinjects can be particularly useful in researching how to better secure and protect computer systems, especially those connected to the Internet. In some instances, the automatic classification of webinjects enabled by the systems and methods described herein provides significant increases in processing efficiencies over conventional techniques. Remote detection can be achieved without the use of installed detection software on a system. For example, instead of installed detection software, software can be remotely detected on any web browser that visits an detection webpage. For the purposes of clarity and conciseness, the methods and systems of FIGS. 1-3 are described together herein below.

Figure 1:
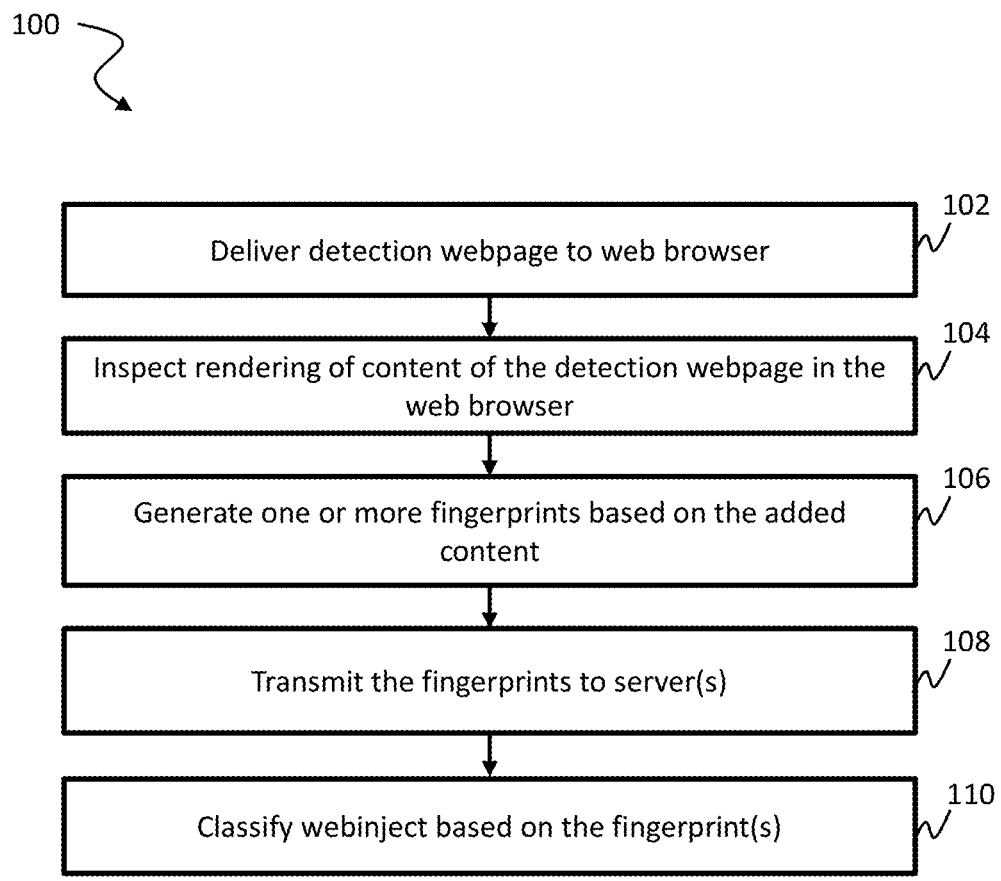
FIG. 1 is a flowchart of an exemplary embodiment of a computer implemented method for the remote detection of webinjects.

FIG. 1 is a flowchart of an exemplary embodiment of a computer implemented method 100 for the remote detection of webinjects. FIGS. 2A-2B are diagrams of exemplary embodiments of systems 200 and 201, respectively, for the remote detection of webinjects.

In step 102 of the method 100, one or more detection webpages 204 are delivered to one or more web browser. In some embodiments, the one or more detection webpages 204 can be distributed by a third party traffic generating entity 206 with access to a high volume of web traffic (e.g., an advertising network, a website with a large number of daily visitors, etc.) that enables the one or more detection webpages 204 to reach a large number of browsers 208 across the Internet. In some embodiments, the system 200 may receive an indication of a user interaction with the content of a webpage in a browser. For example, the one or more detection webpages 204 can be delivered to a web browser 208 after a user clicks an advertisement in a webpage. The advertisement in the webpage can link to the detection webpage(s) 204 and may be acquired for the purpose of generating traffic to the detection webpage(s) 204. For instance, the advertisement can be configured such that, once a user clicks on an advertisement in the webpage, the browser is redirected to the detection webpage. In some embodiments, the one or more detection webpages 204 are not delivered directly as the main page of the web browser 208. Instead, the one or more webpages 204 can be embedded by a traffic generating entity 206 into an external main webpage 209 (e.g., a third-party webpage that is not part of the detection system), as one or more HTML inline frames (also referred to as an "iframe"). Iframes enable the embedding and/or displaying of a first HTML page into a second HTML page. One advantage of using iframes is that, because iframes can be made invisible to the user (and can be sandboxed and isolated from the external main webpage 209), there is minimal to zero impact to the user's navigation experience and/or to the operation of the traffic generating entity.

While some webinjects are injected into as many webpages 209 as possible (and therefore, into every detection webpage 204 associated with the webpage), some software ("webinject originator" 216) may only inject its webinject(s) 212 when a specific website is visited (e.g., online banking websites, social media websites, etc.). To detect this webinject 212, one or more source domains, one or more paths, and/or an HTML structure of the detection webpage 204 is configured to match the webinject targets (i.e., the online banking website, etc.). For example, the webinject 212 may only be injected by the originator 216 if the browser 208 is visiting the site:

webinjecttarget.com

Further, the originator 216 may be using a rule (e.g., a regular expression) to search for the target domain of a webpage while the browser 208 is loading the webpage. In many instances, this rule is not sufficiently specific to the term "webinjecttarget.com". The uniform resource locator (URL) and/or content of the detection webpage(s) 204 can be configured such that, the detection webpage 204 can "bait" or trigger the webinject 212 to be injected into the detection webpage 204 itself. An example of such an URL of the detection webpage 204 used in an iframe inserted by a traffic generating entity 206 on an external webpage 209 is:

<iframe src="https://webinjecttarget.com.detection-system.com/webinjecttarget.com/login.aspx">

In step 104, the detection code 202 is executed during and/or after the rendering of the detection webpage 204 in the browser 208, to detect the webinject 212 content on the detection webpage 204 Document Object Model (DOM). The detection code can inspect the rendering of the detection webpage 204 by using JavaScript functions that are triggered on specific webpage rendering events. The webinject content can include one or more Hypertext Markup Language (HTML) components. The detection code inspects the rendering of the detection webpage 204 in the web browser 208. This inspection can be done through the use of a JavaScript function that compares the content of the detection webpage 204 after the content is rendered with the content that were delivered, through monitoring specific JavaScript function calls that are commonly used by webinjects 212 or through using content security policy (CSP) rules that trigger an action on any change to the original delivered detection webpage 204.

In step 106, if detection code 202 detects webinject content in the detection webpage 204, the detection code 202 generates a set of fingerprints based on the webinject content. These fingerprints are generated using an algorithm that selects one or more webinject blocks of code. and normalizes the one or more blocks of code. An example of a webinject block of code is an inline HTML script tag added to the webpage. There may be one or more blocks of code belonging to one or more webinjects. For example, normalization of the blocks include removing parts of the blocks that are specific to the browser instance (such as unique identifiers), normalizing character case, etc. The algorithm then creates a unique identifier of each block's contents that can be smaller than the webinject content itself and that is unique for a particular content. This unique identifier, also referred to as fingerprint in this document, can be calculated using hashing functions or even simpler cyclic redundancy check (CRC) algorithms that produce a unique number for a given input content.

In step 108, code 202 transmits the fingerprints to one or more server(s) 214 where they are stored and/or processed. Additionally, on a small sample of the executions of the detection code 202, the detected webinject content is transmitted to an external server, along with the respective fingerprints. In an exemplary embodiment utilizing CSP, CSP reports are sent by browser 208 to server 214 if a webinject is detected, the fingerprint is then calculated by a method similar to the one described above but on the server 214 and using the contents of the CSP report.

The one or more fingerprints can be used to classify the webinject 212 and/or identify the originator 216 of the webinject 212. Thus, in step 110, server 214 classifies the webinject 212 based on the received fingerprints. The server 214 can classify the detected webinject into a specific category, based on a database that maps each of the fingerprints to details about the webinject 212 and/or originator 216. In some embodiments, method 100 can include generating a database including the fingerprint(s), the name of the origin software, and/or a list of features and/or capabilities of the detected webinject content. For example, features or capabilities can include intercepting communication or changing form contents. This database can be built manually and/or by automated processing of the webinject content blocks that are sent, along with the respective fingerprints, to the server 214 in step 108. Once these samples are received in server 214, they are used to identify the originator 216 of the webinject, by searching for the presence of the same blocks of webinject code in the sandboxed execution of the software and by searching other, open or commercially available data sources.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

FIG. 3 is a block diagram of an example computer system 300 that may be used in implementing the technology described in this disclosure. General-purpose computers, network appliances, mobile devices, or other electronic systems may also include at least portions of the system 300. The system 300 includes a processor 310, a memory 320, a storage device 330, and an input/output device 340. Each of the components 310, 320, 330, and 340 may be interconnected, for example, using a system bus 350. The processor 310 is capable of processing instructions for execution within the system 300. In some implementations, the processor 310 is a single-threaded processor. In some implementations, the processor 310 is a multi-threaded processor. The processor 310 is capable of processing instructions stored in the memory 320 or on the storage device 330.

The memory 320 stores information within the system 300. In some implementations, the memory 320 is a non-transitory computer-readable medium. In some implementations, the memory 320 is a volatile memory unit. In some implementations, the memory 320 is a non-volatile memory unit.

The storage device 330 is capable of providing mass storage for the system 300. In some implementations, the storage device 330 is a non-transitory computer-readable medium. In various different implementations, the storage device 330 may include, for example, a hard disk device, an optical disk device, a solid-date drive, a flash drive, or some other large capacity storage device. For example, the storage device may store long-term data (e.g., database data, file system data, etc.). The input/output device 340 provides input/output operations for the system 300. In some implementations, the input/output device 340 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 360. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 330 may be implemented in a distributed way over a network, such as a server farm or a set of widely distributed servers, or may be implemented in a single computing device.

Although an example processing system has been described in FIG. 3, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A computer-implemented method for detection of a webinject, the method comprising:
   delivering a detection webpage to a web browser, the detection webpage having detection code configured to detect a presence of the webinject in the detection webpage;
   inspecting, by the detection code, rendering of content of the detection webpage in the browser to detect webinject content in the detection webpage by the webinject, the webinject content including one or more Hypertext Markup Language (HTML) components;
   if webinject content is detected, generating, by the detection code, a fingerprint for each of the one or more HTML components;
   transmitting, by the detection code, the one or more fingerprints to an external server;
   transmitting to the external server, by the detection code, the one or more HTML components of the detected webinject content, the transmission performed by a portion of executions of the detection code;
   identifying an origin software of the one or more HTML components by at least one of: (i) searching for the one or more HTML components in sandboxed executions of software or (ii) searching through privately- or publicly-available data sources;
   generating a database of (a) the one or more fingerprints, (b) a name of the origin software, (c) one or more features of the detected webinject content, and/or (d) one or more capabilities of the detected webinject content; and
   classifying, by the external server, the webinjects based on the one or more known fingerprints.

2. The method of claim 1, wherein delivering the detection webpage having detection code further comprises:
   configuring the detection code such that at least one of: (i) a source domain, (ii) a path, or (iii) an HTML structure of the detection webpage is configured to trigger an injection of the webinject content by the webinject.

3. The method of claim 1, wherein the detection code comprises JavaScript or Content Security Policy (CSP).

4. The method of claim 1, wherein the detection webpage is inserted into an Hypertext Markup Language (HTML) inline frame.

5. The method of claim 1, wherein classifying the webinject based on the one or more fingerprints further comprises:
   determining an origin software of the webinject based on the one or more fingerprints.

6. The method of claim 1, wherein classifying the webinject based on the one or more fingerprints further comprises:
   mapping the one or more fingerprints to a feature set of the webinject.

7. The method of claim 1, wherein the detection webpage is delivered by a traffic generating entity.

8. The method of claim 7, wherein delivering the detection webpage to the web browser further comprises:
   embedding, by the traffic generating entity, the detection webpage into an external webpage.

9. The method of claim 1, wherein delivering the detection webpage to the web browser occurs upon receiving an indication of a user interaction with the content of a webpage, the webpage separate from the detection webpage.

10. The method of claim 1, wherein the software, of the sandboxed executions of software, comprises at least one of the group consisting of: (i) software associated with the origin software of the webinject; (ii) software related to the origin software; and (iii) the origin software.

11. A system for detection of webinjects, the system comprising:
   one or more computer systems programmed to perform operations comprising:
      delivering a detection webpage to a web browser, the detection webpage having detection code configured to detect a presence of the webinject in the detection webpage;
      inspecting, by the detection code, rendering of content of the detection webpage in the browser to detect webinject content in the detection webpage by the webinject, the webinject content including one or more Hypertext Markup Language (HTML) components;
      if webinject content is detected, generating, by the detection code, a fingerprint for each of the one or more HTML components;
      transmitting, by the detection code, the one or more fingerprints to an external server;
      transmitting to the external server, by the detection code, the one or more HTML components of the detected webinject content, the transmission performed by a portion of executions of the detection code;
      identifying an origin software of the one or more HTML components by at least one of: (i) searching for the one or more HTML components in sandboxed executions of software or (ii) searching through privately- or publicly-available data sources;
      generating a database of (a) the one or more fingerprints, (b) a name of the origin software, (c) one or more features of the detected webinject content, and/or (d) one or more capabilities of the detected webinject content; and
      classifying, by the external server, the webinjects based on the one or more known fingerprints.

12. The system of claim 11, wherein delivering the detection webpage having detection code further comprises:
   configuring the detection code such that at least one of (i) a source domain, (ii) a path, or (iii) an HTML structure of the detection webpage is configured to trigger an injection of the webinject content by the webinject.

13. The system of claim 11, wherein the detection code comprises JavaScript or Content Security Policy (CSP).

14. The system of claim 11, wherein the detection webpage is inserted into an Hypertext Markup Language (HTML) inline frame.

15. The system of claim 11, wherein classifying the webinject based on the one or more fingerprints further comprises:
   determining an origin software of the webinject based on the one or more fingerprints.

16. The system of claim 11, wherein classifying the webinject based on the one or more fingerprints further comprises:
   mapping the one or more fingerprints to a feature set of the webinject.

17. The system of claim 11, wherein the detection webpage is delivered by a traffic generating entity.

18. The system of claim 17, wherein delivering the detection webpage to the web browser further comprises:
   embedding, by the traffic generating entity, the detection webpage into an external webpage.

19. The system of claim 11, wherein delivering the detection webpage to the web browser occurs upon receiving an indication of a user interaction with the content of a webpage, the webpage separate from the detection webpage.

20. The system of claim 11, wherein the software, of the sandboxed executions of software, comprises at least one of the group consisting of: (i) software associated with the origin software of the webinject; (ii) software related to the origin software; and (iii) the origin software.

\* \* \* \* \*